United States Patent [19]

White

[11] Patent Number: 5,287,180
[45] Date of Patent: Feb. 15, 1994

[54] MODULATOR/DEMODULATER FOR COMPATIBLE HIGH DEFINITION TELEVISION SYSTEM

[75] Inventor: Hugh E. White, Pennington, N.J.

[73] Assignee: General Electric Company, Princeton, N.J.

[21] Appl. No.: 650,329

[22] Filed: Feb. 4, 1991

[51] Int. Cl.$^5$ .............................................. H04N 7/00
[52] U.S. Cl. .................................... 348/484; 348/473
[58] Field of Search .............. 358/141, 142, 146, 11, 358/12, 13; H04N 7/00, 7/08, 7/087

[56] References Cited

U.S. PATENT DOCUMENTS

| | | | |
|---|---|---|---|
| 5,063,445 | 11/1991 | Nishizawa et al. | 358/141 |
| 5,134,464 | 7/1992 | Basile et al. | 358/143 |

FOREIGN PATENT DOCUMENTS

| | | |
|---|---|---|
| 0279625 | 8/1988 | European Pat. Off. |
| 0361564 | 4/1990 | European Pat. Off. |
| 0364285 | 4/1990 | European Pat. Off. |
| 9115925 | 10/1991 | PCT Int'l Appl. |

OTHER PUBLICATIONS

IEEE Transactions on Consumer Electronics, vol. 36, No. 3, Aug. 1990, IEEE, (New York), W. Bretl et al., "Video Encoding In The Spectrum-Compatible HDTV System", pp. 172-176.
Proceedings of the Third International Workshop on HDTV, "Signal Processing of HDTV, II", CSELT, Turin, Aug. 30-Sep. 1, 1989, S. N. Baron et al., "An Evolutionary Approach To Advanced Television Services: The ACTV (Advanced Compatible Television) System", pp. 195-211.
"HDS/NA: An Analog Simulcast High Definition Television System", by M. Tsinberg et al., IEEE Transactions on Consumer Electronics, vol. 36, No. 3, Aug. 1990.
General Instrument Corporation report on the Digicipher HDTV System, Jun. 8, 1990.
"Advanced Television Systems For The U.S.A." by B. J. Lechner, Information Display, May 1990.
"Spectrum Compatible High Definition Television", by C. G. Eilers et al., IEEE Transactions on Broadcasting, vol. 36, No. 1, Mar. 1990.
"High Definition And High Frame Rate Compatible N.T.S.C. Broadcast Television System", by G. W. Meeker, IEEE Transactions on Broadcasting, vol. 34, No. 3, Sep. 1988.
"An Extended Definition Television System Using Quadrature Modulation Of The Video Carrier With Inverse Nyquist Filter", by Y. Yasumoto et al., IEEE Transactions on Consumer Electronics, vol. CE-33, No. 3, Aug. 1987.

*Primary Examiner*—James J. Groody
*Assistant Examiner*—David E. Harvey
*Attorney, Agent, or Firm*—Joseph S. Tripoli; Eric P. Herrmann; Ronald H. Kurdyla

[57] ABSTRACT

An NTSC bandwidth-compatible HDTV system employs multiple quadrature amplitude modulation (QAM). A first suppressed QAM carrier is modulated with high priority information including predominantly low frequency information. A second suppressed QAM carrier is modulated with low priority information including predominantly high frequency information. The high priority QAM signal exhibits a larger amplitude and narrower bandwidth than the low priority QAM signal, and is disposed in the lower portion of the multiple QAM frequency spectrum normally occupied by the vestigial sideband of a standard NTSC television signal. The frequency spectrum of the multiple QAM signal exhibits signal attenuation at frequencies associated with high energy information in a standard NTSC signal, e.g., frequencies around the NTSC picture and sound carriers.

39 Claims, 4 Drawing Sheets

BIT ASSIGNMENT FOR 16-LEVEL QAM SIGNAL CONSTELLATION

MODULATOR/DEMODULATER FOR COMPATIBLE HIGH DEFINITION TELEVISION SYSTEM

FIELD OF THE INVENTION

This invention concerns a high definition television system compatible with the bandwidth of a preexisting standard definition television channel. In particular, this invention concerns a modulation technique for reducing mutual interference between simulcast high definition television signals and standard definition television signals.

BACKGROUND OF THE INVENTION

A high definition television (HDTV) system is generally understood to be a system for processing a television signal having approximately double the horizontal and vertical image resolution of a standard television signal, e.g., NTSC, or greater resolution. An HDTV signal also may exhibit a greater image aspect ratio, e.g., 16×9, compared to the 4×3 aspect ratio of a standard NTSC television image.

In a simulcast television broadcast system, two versions of the same program material are broadcast simultaneously via separate standard 6 MHz channels. One of the two program versions contains standard definition NTSC information broadcast on one channel, while the other contains high definition information broadcast on the other 6 MHz channel. In practice, a simulcast system may utilize two adjacent 6 MHz NTSC channels, e.g., VEF channels 3 and 4, to convey the standard and HDTV information respectively. The high definition version of a simulcast system can be implemented in a single 6 MHz channel by the use of signal encoding and time compression techniques. The standard NTSC information and the HDTV information are received independently by respective standard NTSC and HDTV receivers. When standard NTSC receivers are eventually replaced by HDTV or dual-standard receivers, perhaps in 15-20 years, the channels used by standard NTSC television signals will become available for other purposes. Thus the simulcast concept prevents the vast number of preexisting standard NTSC receivers from becoming obsolete as soon as HDTV broadcasting is introduced, and permits expanded broadcasting services in the future when the channels occupied by standard NTSC signals become available.

A simulcast system differs from a so-called augmentation system in that an augmentation system requires the continuing use of two channels. One channel conveys standard NTSC information, while the other channel contains predetermined augmentation information which, when combined at an HDTV receiver with the standard NTSC information from the first channel, produces a high definition television signal.

It is important to significantly reduce or eliminate co-channel interference between the standard and HDTV signals transmitted from different locations on the same channel. A system according to the present invention addresses this matter.

SUMMARY OF THE INVENTION

In accordance with an aspect of the present invention, high definition television information to be transmitted is divided into high priority information which is intended to be received with high reliability, and low priority information. The high priority information and the low priority information are conveyed as separate modulated carrier signals within different portions of a frequency spectrum which exhibits signal attenuation at frequencies associated with high energy information of a standard definition (e.g., NTSC) signal.

In a disclosed preferred embodiment of the invention, the high priority information exhibits a narrow bandwidth relative to the low priority information, and illustratively includes low frequency video, audio and synchronizing information. The low priority information includes high frequency video information. The high priority and low priority information are conveyed by means of a multiple quadrature amplitude modulation (QAM) technique. The high priority narrowband information exhibits a significantly larger amplitude than the low priority wideband information, and quadrature amplitude modulates a first suppressed carrier in the lower frequency portion of the video frequency spectrum. The modulated first carrier is subject to being attenuated significantly by a Nyquist slope filter in a standard television receiver. The low priority wideband information quadrature amplitude modulates a second suppressed carrier in the video frequency spectrum, producing a multiple QAM signal. The frequency spectrum of the multiple QAM signal exhibits signal attenuation at frequencies associated with high energy information in the vicinity of NTSC picture and sound carriers.

DETAILED DESCRIPTION OF THE DRAWING

Figure 1:
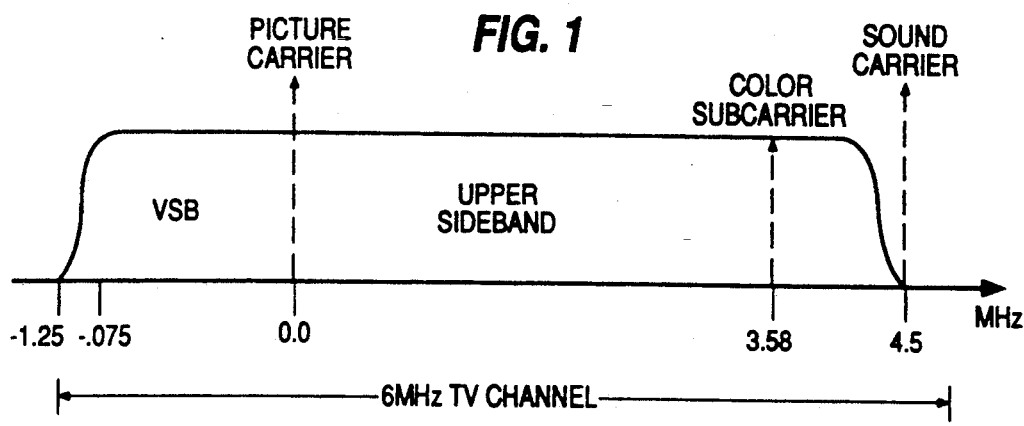
FIG. 1 depicts the baseband video frequency spectrum of a standard NTSC television signal.

FIG. 1 illustrates the baseband video frequency spectrum of a standard NTSC television signal, which occupies a 6 MHz channel. In accordance with conventional practice, the indicated frequencies are referenced to 0.0 MHz, about which an RF picture carrier is amplitude modulated with video information in vestigial sideband form. The modulated signal exhibits a lower vestigial sideband (VSB) with a 1.25 MHz bandwidth, and an upper sideband containing image representative luminance and chrominance information. The chrominance information quadrature modulates a 3.58 MHz suppressed color subcarrier. Most of the high energy information appears in the vicinity of the picture carrier frequency and in the vicinity of the frequency modulated 4.5 MHz sound carrier frequency.

Figure 2:
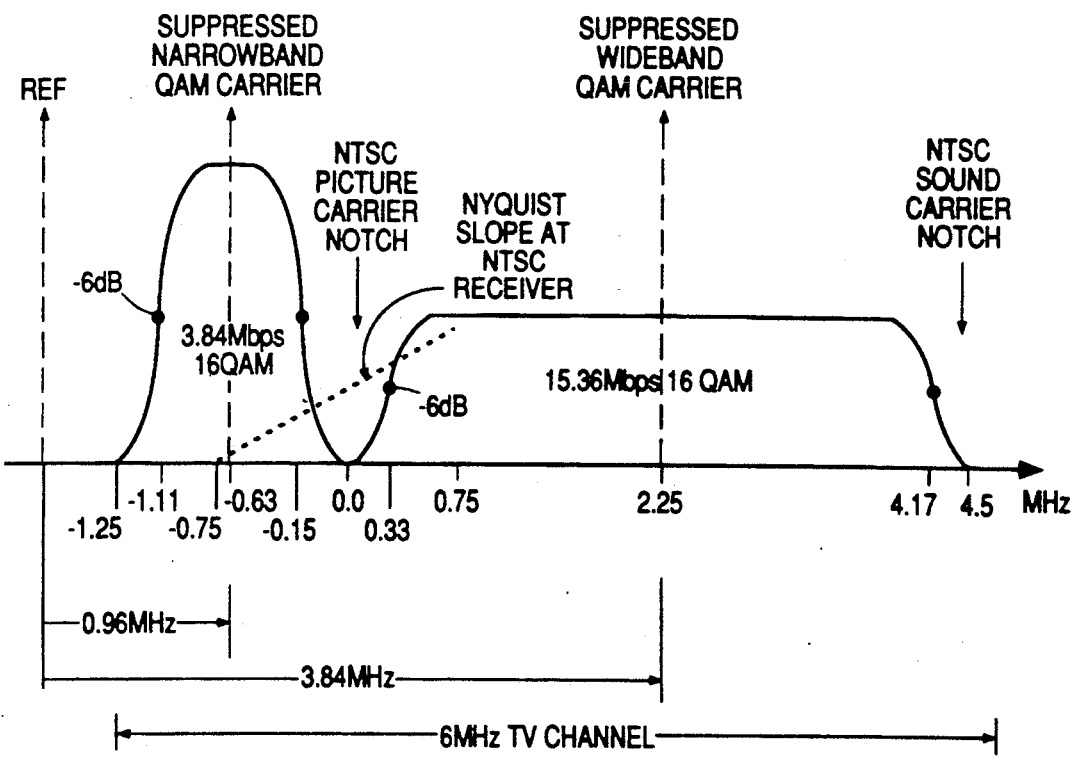
FIG. 2 depicts the video frequency spectrum of a multiple QAM high definition television signal according to the present invention.

FIG. 2 illustrates the video frequency spectrum of a high definition television signal which is compatible with the 6 MHz bandwidth of a standard NTSC television signal channel, and which can be used as a simulcast signal. To facilitate comparison with the standard NTSC video frequency spectrum shown in FIG. 1, the frequencies along the frequency scale of FIG. 2 (−1.25 MHz to 4.5 MHz) are referenced to the 0.0 MHz frequency location of the RF picture carrier in an NTSC system.

The HDTV television signal is a time compressed signal divided into high and low priority information components. In this example audio, synchronizing and low frequency video information components which are intended to be received with high reliability are assigned a high priority. The synchronizing information, for example, may be in the nature of a training signal containing a unique signature or code to facilitate signal recovery and processing at a receiver, and illustratively may include field rate scanning information (e.g., start of field markers). Other less critical components, such as high frequency video information, are assigned a lower priority. The high priority information exhibits a narrow bandwidth relative to the low priority information, and quadrature amplitude modulates (QAM) a 0.96 MHz first suppressed carrier referenced to a signal REF as discussed below. The low priority information quadrature amplitude modulates a 3.84 MHz second suppressed carrier which is also referenced to signal REF. A resulting composite signal is a form of a multiple QAM signal, i.e., a "twin" QAM signal in this instance. The composite twin QAM signal is translated into the 6 MHz standard television band by means of out-of-band reference signal REF. The frequency of signal REF is chosen so that when signal REF is modulated by the composite QAM signal, one of the resulting sum or difference components falls within the band of frequencies associated with a desired radio frequency television channel, such as simulcast VHF channel 3. Signal REF is modulated by the composite twin QAM signal to produce a double sideband modulated signal, the lower sideband of which is rejected and the upper sideband of which is retained as illustrated by FIG. 2.

The amplitude of the narrowband QAM component is significantly greater than that of the wideband QAM component, twice as large in this example. The −6 db bandwidth of the narrowband QAM component is 0.96 MHz, and the −6 db bandwidth of the wideband QAM component is 3.84 MHz which is four times the bandwidth of the narrowband QAM component. The nonlinear band edge transition regions of the narrowband and wideband QAM components are shaped by finite impulse response (FIR) filters with a square root of a raised cosine characteristic, to produce smooth transition regions which avoid unwanted high frequency effects produced by sharp transition regions. The amplitude-versus-frequency response of the wideband component in the band edge transition regions (not drawn to scale) has one quarter the slope of the steeper narrowband component.

The narrowband and wideband QAM components each contain an in-phase component "I" and a quadrature-phase component "Q". As will be discussed in connection with FIG. 3, the I-phase component modulates a suppressed cosine carrier, and the Q-phase component modulates a suppressed sine carrier. A data "symbol" is represented by both the I component and the Q component. The composite QAM signal is a "16 QAM" signal in this example. Each 16 QAM I and Q component exhibits four discrete amplitude levels, resulting in a total of 4×4 or 16 possible amplitude levels, or values, for each of the narrowband and wideband QAM signals, hence "16" QAM. Two bits are needed to specify the four levels of each I and Q component, whereby each data symbol requires four bits to specify the sixteen levels for an I, Q combination. Thus the bit rate of the 3.84 MHz (−6 db) wideband QAM signal is 15.36 Mbps (3.84 MHz×4 bits), and the bit rate of the 0.96 MHz (−6 db) narrowband QAM signal is 3.84 Mbps (0.96 MHz×4 bits). In a 64 QAM system, the bit rates of the narrowband and wideband components would increase by a factor of 1.5.

The described multiple (twin) QAM system exhibits significant co-channel immunity from interference associated with a standard NTSC television signal, i.e., an NTSC signal transmitted from a different location in the same channel as the twin QAM signal. This is due to attenuating notches in the QAM spectrum in the vicinity of the NTSC RF picture carrier and the NTSC sound carrier, which are associated with high energy information. Conversely, co-channel interference from the twin QAM signal into an NTSC signal is significantly reduced because the large amplitude narrowband QAM signal will be significantly attenuated by a Nyquist slope filter in a standard NTSC television receiver. In FIG. 2 the Nyquist slope filter response in a standard NTSC receiver is indicated by a dotted line superimposed on the low band portion of the QAM spectrum from −0.75 MHz to 0.75 MHz. It has been observed that the 6 db greater amplitude of the narrowband QAM signal relative to the wideband QAM signal, i.e., exhibiting four times the power of the wideband QAM signal, produces about the same amount of tolerably small interference as the lower power wideband QAM signal. The combination of the 6 db greater amplitude of the narrowband QAM component and its one-quarter bandwidth relative to the wideband QAM component results in a power density 12 db greater than that of the wideband QAM component. The illustrated high priority narrowband QAM signal therefore exhibits a 12 db signal-to-noise improvement and lower error rate relative to the low priority wideband QAM signal. The relative bandwidths and amplitudes of the wideband and narrowband QAM signals can be tailored to suit the requirements of a particular system including NTSC and PAL television systems.

The large peak amplitude narrowband component contains video information sufficient to produce a displayed image with definition approximating that of a standard definition television image. Thus a viewer should not be overly disturbed if, for example, the high definition transmission is momentarily disrupted by aircraft flutter. That is, if the low power wideband component containing the high definition information is disrupted momentarily, the high power narrowband component may be unaffected whereby a lower definition but acceptable image is displayed momentarily.

The bit rates of the wideband and narrowband QAM signals, 15.36 Mbps and 3.84 Mbps respectively, advantageously exhibit a 4:1 integer relationship. This relationship simplifies recovering the narrowband and wideband QAM information at a receiver, since the same derived data clock can readily be used for timing the data recovery operation of both QAM components. The required data clock rates for the receiver system can be easily derived from the readily recovered high power narrowband QAM signal, as will be discussed.

Figure 3:
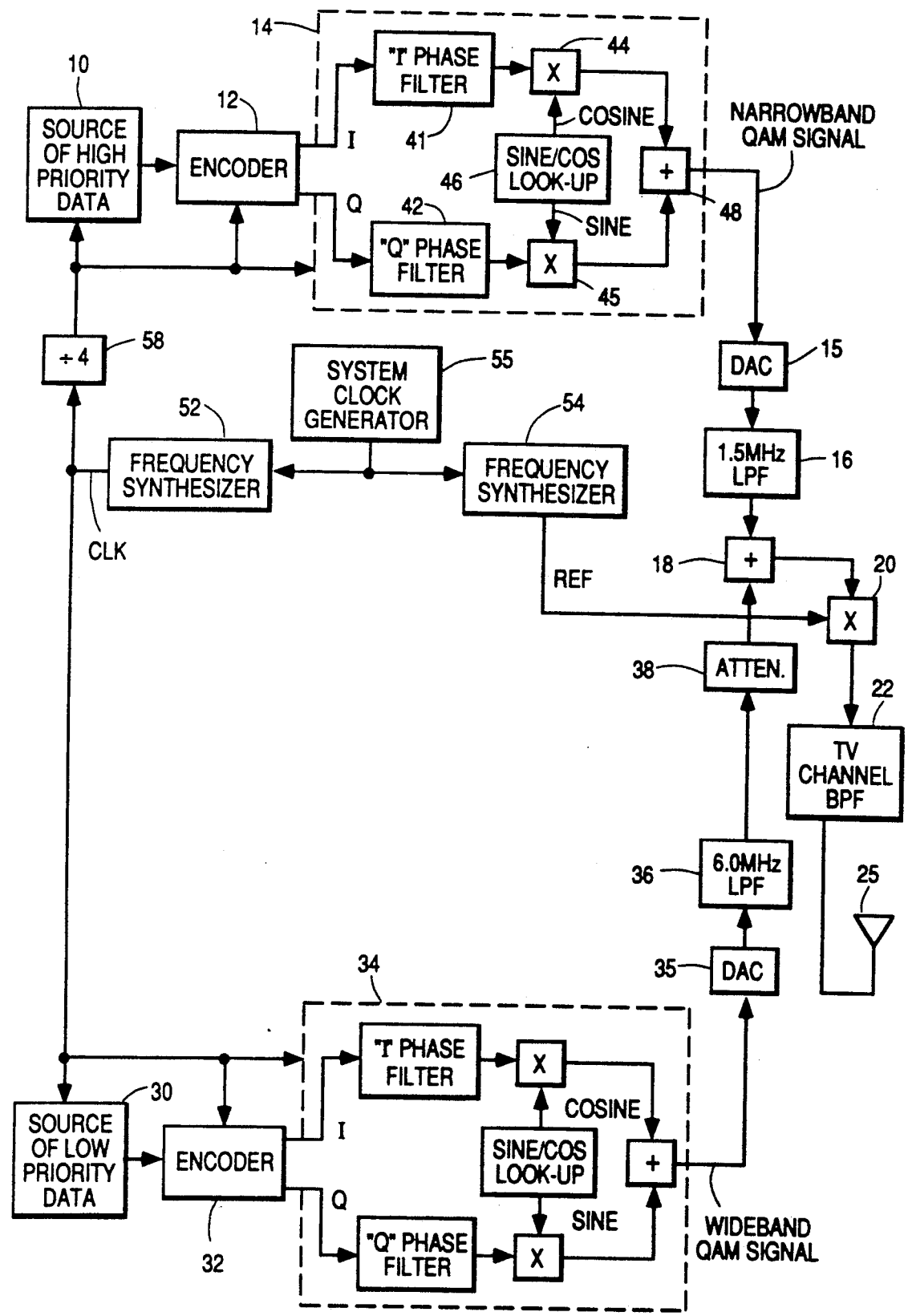
FIGS. 3 and 4 respectively illustrate transmitter and receiver apparatus for processing a high definition multiple QAM signal according to the present invention.

FIG. 3 shows television transmitter apparatus for developing a twin QAM signal having the amplitude-versus-frequency spectrum shown in FIG. 2. High priority and low priority HDTV data are provided from sources 10 and 30 in time compressed digital form to be compatible with the 6 MHz bandwidth of a standard NTSC channel. For this purpose sources 10 and 30 contain digital time compression and encoding apparatus including Huffman coding, run-length coding, quantizing and discrete cosine transformation networks, for example.

Figure 5:
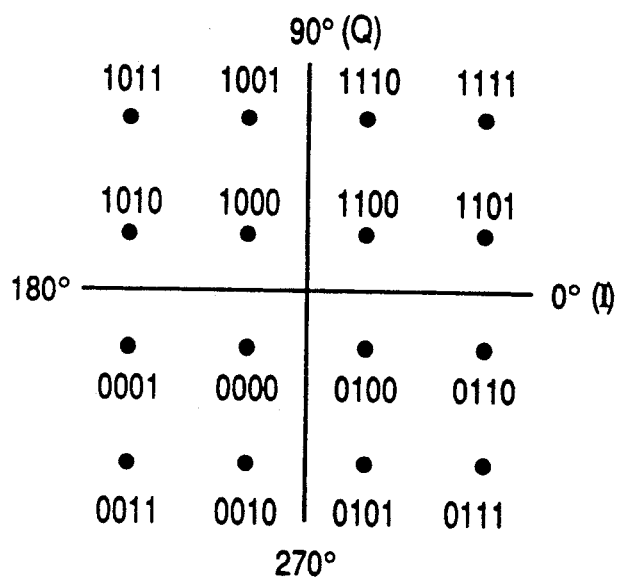
FIG. 5 is a diagram helpful in understanding a signal processing aspect of the disclosed system.

The output signal from source 10 is applied to an encoder 12, which acts as a bit-mapper for the continuous bit stream signal received from source 10. Encoder 12 splits the signal from source 10 into sequential 4-bit (symbol) segments. One 16-value, 4-bit segment is mapped into a four quadrant grid-like signal constellation using a look-up table, with four 4-bit values occupying assigned areas in each quadrant, as is known. FIG. 5 illustrates such a bit assignment for a 16-bit QAM signal constellation with respect to a four quadrant grid with real (I) and imaginary (Q) axes. This mapped bit segment appears at I and Q outputs of encoder 12 (e.g., the first two bits appear at the I output and the next two bits appear at the Q output). The next 16-value, 4-bit segment is similarly mapped. To allow a receiver to be insensitive to a phase rotation of the received signal constellation, a form of differential encoding is used at the transmitter whereby the first two bits of each four bit segment define the constellation quadrant in which the four bit segment is located, and the last two bits define the particular point within the quadrant. Encoder 32 operates in the same manner with respect to signals received from low priority data source 30.

The output signals from encoders 12 and 32 are applied to respective QAM modulators 14 and 34 of conventional design. A narrowband QAM output signal from modulator 14 is converted to analog form by a digital-to-analog converter 15 before being applied to an input of an additive combiner 18 via a 1.5 MHz horizontal low pass filter 16. Filter 16 removes unwanted high frequency components including harmonics produced by prior digital processing and digital-to-analog conversion circuits in the narrowband path. A wideband QAM output signal from modulator 34 is converted to analog form by a digital-to-analog converter 35 before being applied to another input of combiner 18 via a 6.0 MHz horizontal low pass filter 36 and an attenuator 38. Filter 36 serves essentially the same purpose as filter 16. Attenuator 38 scales the amplitude of the wideband QAM component so that it is −6 db less than the amplitude of the high priority narrowband QAM component, as illustrated in FIG. 2. A composite twin QAM signal is produced at the output of combiner 18. This twin QAM signal is multiplied by a reference signal REF in a modulator (mixer) 20 to produce signal REF double sideband modulated with upper and lower twin QAM sidebands at the output of modulator 20. A 6 MHz TV channel bandpass filter 22 rejects the lower sideband, but retains the upper sideband (FIG. 2) for transmission via apparatus including an antenna 25.

QAM modulator 14 contains identical square root raised cosine, finite impulse response (FIR) digital filters 41 and 42 which receive the I and Q output signals from encoder 12, respectively. Filter 41 is located in a nominal in-phase path and is designated as an "I" phase filter, whereas filter 42 is located in a nominal quadrature-phase path and is designated as a "Q" phase filter. Filters 41 and 42 shape the nonlinear band edge transition regions of the narrowband and wideband QAM components as discussed in connection with FIG. 2.

Output signals from filters 41 and 42 are respectively modulated in multipliers 44 and 45 with COSINE and SINE reference signals. These signals are provided from a source 46, e.g., including a look-up table which produces sine and cosine values at four 90° intervals per period, namely, 90°, 180°, 270° and 360°. The SINIE and COSINE reference signals correspond to the narrowband QAM suppressed quadrature carrier at a frequency of 0.96 MHz, i.e., 3.84 Mbps/4. Quadrature phased modulated output signals from multipliers 44 and 45 are combined by an adder 48 to produce the high priority narrowband QAM signal. Wideband QAM modulator 34 is structurally and operationally similar to modulator 14, except that the frequency of the associated SINE and COSINE quadrature carrier signals is 3.84 MHz.

The system shown in FIG. 3 employs 2's complement 8-bit digital signal processing. Digital data clock signals are provided by frequency synthesizers 52 and 54 in response to a master clock signal developed by a system clock generator 55. A 15.36 MHz clock signal CLK from synthesizer 52 acts as the data clock for data source 30, encoder 32 and wideband QAM modulator 34. Clock CLK also serves as the data clock for data source 10, encoder 12 and narrowband QAM modulator 14 after being frequency divided to 3.84 MHz by a divide-by-four frequency divider 58, since the data rate of the narrowband data (3.84 Mbps) is one-quarter that of the wideband data (15.36 Mbps). Synthesizer 54 provides reference signal REF for translating the composite twin QAM signal to the television frequency band via mixer 20.

The narrowband and wideband QAM carriers need not be suppressed, although the use of suppressed carriers provides power savings and avoids certain types of interference in a displayed image. Small amplitude non-suppressed carriers may be used to provide improved symbol rate clock recovery. Modulated QAM carriers with unsymmetrical sidebands are also possible.

Figure 4:
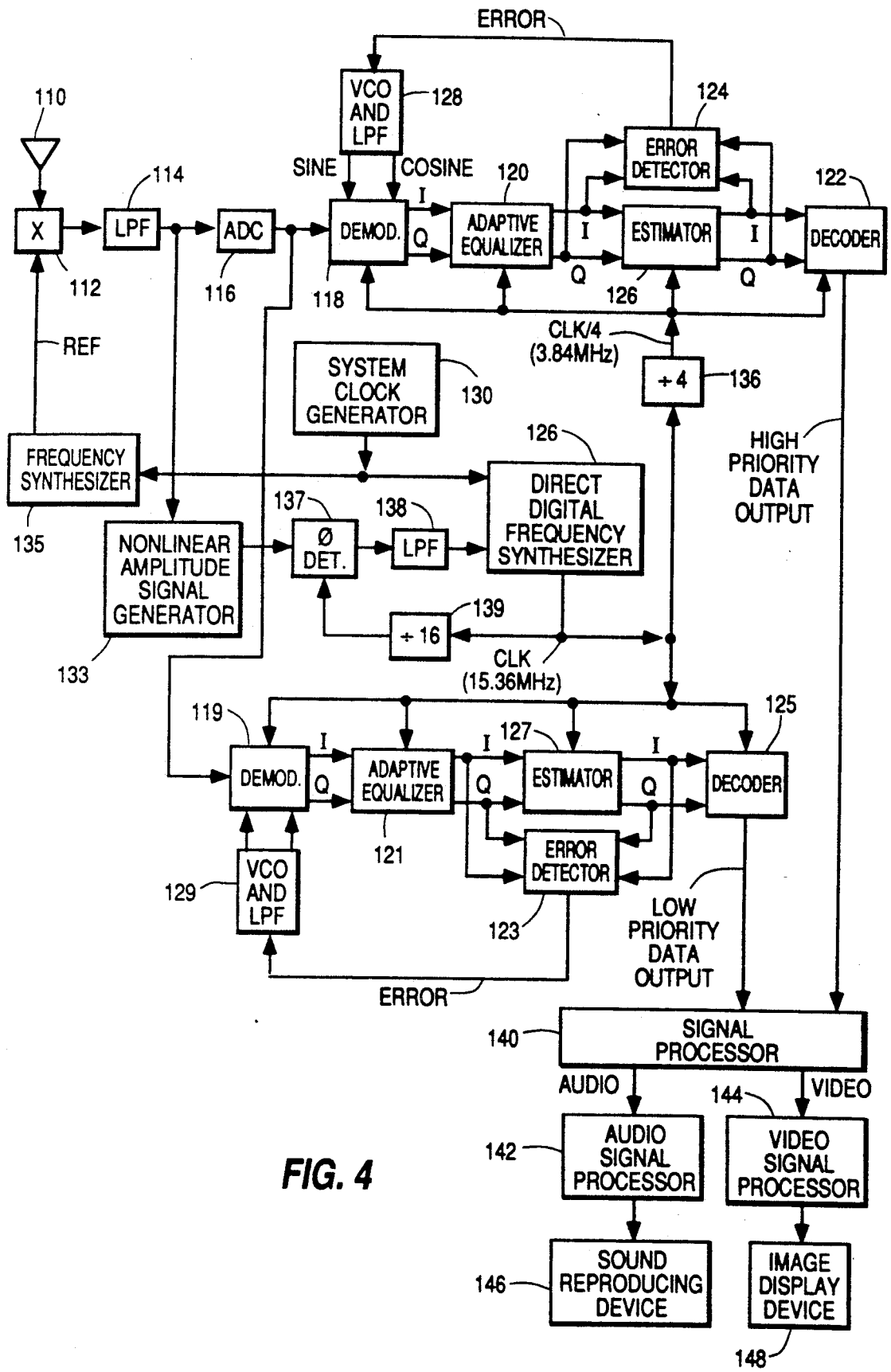

In the receiver apparatus of FIG. 4, a broadcast twin QAM signal received by an antenna 110 is applied to a mixer 112 together with a reference signal REF nominally at the frequency of signal REF used at the transmitter. An output signal from mixer 112 includes sum and difference components. The higher frequency sum component is rejected by a low pass filter 114, which passes the difference component to an analog to digital converter 116. The passed difference component exhibits the composite modulation frequency spectrum shown in FIG. 2, with the narrowband QAM modulation spectrum centered about 0.96 MHz and the wideband QAM modulation spectrum centered about 3.84 MHz.

The digital sampled output signal from unit 116 is applied to a demodulator 118 which, together with succeeding elements 120, 122, 124, 126 and 128 forms a narrowband QAM signal processor. Demodulator 118 includes a plurality of input FIR filters for selectively passing the narrowband QAM component, while rejecting the wideband QAM component. Specifically, narrowband QAM demodulator 118 includes a filter having an amplitude versus frequency response characteristic which substantially conforms to the shape of the amplitude versus frequency characteristic of the modulated narrowband QAM component as shown in FIG. 2. A demodulator 119 in a wideband QAM signal processing network including elements 119, 121, 123, 125, 127 and 129 selectively passes the wideband QAM component while rejecting the narrowband QAM component. Wideband QAM demodulator 119 includes a filter having a response which substantially conforms to the shape of the amplitude versus frequency characteristic of the modulated wideband QAM component, as shown in FIG. 2. Thus the receiver system exhibits signal attenuating notches at frequencies associated with high energy information in a standard definition television signal. The elements of the wideband QAM processor are similar to the correspondingly labeled elements of the narrowband processor which will be discussed below, except that the characteristics of demodulators 118 and 119 differ as mentioned above. Demodulators 118 and 119 perform the inverse of the operation performed by modulators 14 and 34 at the transmitter (FIG. 3).

Adaptive equalizer 120, of conventional design, receives the demodulated quadrature phased I and Q components from demodulator 118. Equalizer 120 employs an adaptive digital FIR filter to compensate for amplitude and phase irregularities, e.g., including ghosts, caused by the transmission channel. Equalized I and Q output signals from unit 120 are applied to an estimator network 126 which produces output I, Q components which represent a most likely estimate of the values of I and Q components as transmitted. For example, the values of the I and Q components at the output of estimator 126 have been adjusted as needed to compensate for the distorting effect of noise acquired in the course of transmission. Estimator 126 essentially performs an interpretive function of assigning values to samples which, due to effects such as noise, do not fit exactly into assigned locations in the 16-point four quadrant signal constellation. Output signals from estimator 126 are applied to a decoder 122, which essentially exhibits the inverse of the mapping operation performed by the encoder at the transmitter. Look-up tables are employed to "unmap" the four quadrant signal constellation into the sequential four-bit (symbol) segments, in binary digit form, which existed at the transmitter before being encoded at the transmitter by unit 12 (FIG. 3).

An error detector 124 monitors the I, Q input and output signals of estimator 126 for producing an output signal with a magnitude proportional to the phase error between the I, Q input and output signals of estimator 126. The phase error can be due to noise effects, in which case the phase error would be random in nature. The phase error also can be due to the frequency of signal REF not being substantially equal to the frequency of corresponding signal REF used at the transmitter, in which case the phase error would not be random in nature. An output ERROR signal from error detector 124 ultimately is used to compensate for the frequency of signal REF deviating from a desired value, i.e., the value of the frequency of corresponding signal REF at the transmitter.

Specifically, the ERROR signal is applied to a voltage controlled oscillator (VCO) network 128, which also includes a low pass filter, for modifying the values of quadrature phased sine and cosine reference signals applied to quadrature demodulator 118. The modified sine and cosine reference signals alter the demodulation process until the magnitude of the error representative output signal from detector 124 indicates that any deviation of the frequency of signal REF from a desired value has been compensated for. The low pass filter associated with unit 128 filters the ERROR signal so that the values of the reference signals from VCO 128 and thereby the operation of demodulator 118 are modified in response to errors of a non-random nature, such as the described frequency deviation, and are unaffected by random effects such as noise. The control loop including units 119, 121, 127, 123 and 129 of the wideband QAM processor operate in the same fashion as units 118, 120, 126, 124 and 128 of the narrowband QAM processor discussed above. Additional information concerning the operation of a control loop of the type including estimator 126, detector 124, VCO 128 and demodulator 118 can be found in the text "Digital Communication", Lee and Messerschmitt, (Kluwer Academic Publishers, Boston, Mass., USA, 1988).

A direct digital frequency synthesizer 126 produces a clock signal CLK in response to a master clock signal from a system clock generator 130, which also provides a clock signal to a frequency synthesizer 135 for developing mixer reference signal REF. The frequency of signal REF nominally corresponds to that of signal REF used at the transmitter. Any deviation of the frequency of signal REF from a desired frequency is compensated for as described above. Signal CLK from source 126 is the clock signal for elements 119, 121, 125 and 127 of the wideband processor. The narrowband processor processes a signal with a bandwidth which is one-fourth that of the wideband signal. Hence, the narrowband processor elements respond to a clock signal CLK/4 with a frequency one-fourth that of signal CLK, as provided by a frequency divider 136.

The frequency of clock signal CLK at the receiver corresponds to the frequency of clock signal CLK employed at the transmitter (FIG. 3). Establishing the proper receiver clock frequency is facilitated by deriving the receiver clock signal from information contained in the more reliably received high power narrowband QAM component. Specifically, the composite QAM signal from the output of LPF 114 is applied to a nonlinear signal generator 133, e.g., a power of N generator where N may be 2 or 4. Unit 133 produces a single frequency component at the symbol rate of the narrowband QAM component. In this case the symbol rate is 0.96 MHz, one-quarter of the bit rate. Unit 133 also produces a highly attenuated output at the symbol rate of the low power wideband QAM component, which output is ignored by subsequent signal processing units.

A phase detector 137 responds to the 0.96 MHz output component from unit 133, and forms a phase locked loop together with a low-pass filter 138, synthesizer 126 and a divide-by-16 frequency divider 139. Filter 138 removes spurious frequencies including noise produced by the operation of nonlinear signal generator 133. Frequency divider 139 receives a 15.36 MHz signal from synthesizer 126 and provides a 0.96 MHz output signal to a control input of phase detector 137. Synthesizer 126 includes a register which accumulates phase increments determined by the signal applied to a control input of unit 126 from filter 138, at a rate determined by the frequency of the signal from clock generator 130. The accumulated phase value addresses a ROM containing sinusoidal values which synthesize the output signal from unit 126. The function of unit 126 can be implemented by integrated circuit type Q2334 commercially available from Qualcomm Corporation of San Diego, Calif.

A signal processor 140 combines the demodulated high priority data signal from decoder 122 the demodulated low priority data signal from decoder 125. Processor 140 may include data decompression networks such as Huffman decoders and inverse quantizers, error correcting networks, and de-multiplexing and signal combining networks for providing separate audio and video television signal components. The audio component is processed by an audio signal processor 142 before being applied to a sound reproducing device 146. The video component is processed by a unit 144 to produce an image representative signal which is applied to an image display device 148.

What is claimed is:

1. A system for processing a high definition television signal providing greater image definition than a standard definition television signal, comprising:
   means for modulating a first carrier with first television signal information to produce a modulated first carrier;
   means for modulating a second carrier with second television signal information to produce a modulated second carrier, said second information exhibiting a smaller amplitude than said first information; and
   means for combining said modulated first and second carriers to produce a composite modulated signal containing high definition television information, said composite signal exhibiting a bandwidth compatible with the bandwidth of a standard definition television signal channel, and having a modulation frequency spectrum exhibiting signal attenuation at frequencies associated with high energy information in said standard definition television signal.

2. A system for processing a high definition television signal providing greater image definition than a standard definition television signal, comprising:
   means for modulating a first carrier with first television signal information to produce a modulated first carrier;
   means for modulating a second carrier with second television signal information to produce a modulated second carrier; and
   means for combining said modulated first and second carriers to produce a composite modulated signal containing high definition television information, said composite signal exhibiting a bandwidth compatible with the bandwidth of a standard definition television signal channel, and having a modulation frequency spectrum exhibiting signal attenuation at frequencies associated with high energy information in said standard definition television signal; wherein
   said first carrier is quadrature amplitude modulated by quadrature phased versions of said first information; and
   said second carrier is quadrature amplitude modulated by quadrature phased versions of said second information.

3. A system according to claim 1, wherein
   said first information exhibits a narrow bandwidth relative to said second information.

4. A system according to claim 1, wherein
   said modulated first carrier is disposed in a lower portion of the frequency spectrum of said composite modulated signal, separated from said modulated second carrier by a band of amplitude attenuated frequencies associated with high energy information in said standard definition television signal.

5. A system according to claim 1, wherein
   said attenuated frequencies are associated with high energy information modulating a picture carrier of said standard definition television signal.

6. A system according to claim 5, wherein
   said composite modulated signal additionally exhibits attenuation at frequencies associated with high energy information modulating a sound carrier of said standard definition television signal.

7. A system according to claim 1, wherein
   said first information is high priority information relative to said second information.

8. A system according to claim 7, wherein
   said first information comprises video information including primarily low frequency video information, and
   said second information includes high frequency video information.

9. A system according to claim 8, wherein
   said first information additionally includes audio and synchronizing information.

10. A system for processing a high definition television signal providing greater image definition than a standard definition television signal, comprising:
    means for modulating a first carrier with first television signal information to produce a modulated first carrier;
    means for modulating a second carrier with second television signal information to produce a modulated second carrier; and
    means for combining said modulated first and second carriers to produce a composite modulated signal containing high definition television information, said composite signal exhibiting a bandwidth compatible with the bandwidth of a standard definition television signal channel, and having a modulation frequency spectrum exhibiting signal attenuation at frequencies associated with high energy information in said standard definition television signal; wherein
    said first and second carriers are suppressed carriers.

11. A system for processing a high definition television signal providing greater image definition than a standard definition television signal, comprising:
    means for modulating a first carrier with first television signal information to produce a modulated first carrier;
    means for modulating a second carrier with second television signal information to produce a modulated second carrier; and
    means for combining said modulated first and second carriers to produce a composite modulated signal containing high definition television information, said composite signal exhibiting a bandwidth compatible with the bandwidth of a standard definition television signal channel, and having a modulation frequency spectrum exhibiting signal attenuation at frequencies associated with high energy information in said standard definition television signal; wherein
    said first information and said second information are compressed digital information.

12. A system for processing a high definition television signal providing greater image definition than a standard definition television signal, comprising:
    means for modulating a first carrier with first television signal information to produce a modulated first carrier;
    means for modulating a second carrier with second television signal information to produce a modulated second carrier; and
    means for combining said modulated first and second carriers to produce a composite modulated signal containing high definition television information, said composite signal exhibiting a bandwidth compatible with the bandwidth of a standard definition television signal channel, and having a modulation frequency spectrum exhibiting signal attenuation at frequencies associated with high energy information in said standard definition television signal; wherein said first information is higher priority information relative to said second information and exhibits a narrow bandwidth relative to said second information;

said first information exhibits a large amplitude relative to said second information;

said first information quadrature amplitude modulates said first carrier;

said second information quadrature amplitude modulates said second carrier;

said composite signal modulation frequency spectrum exhibits signal attenuation at frequencies associated with information modulating at least one of a picture carrier or sound carrier of said standard definition television signal; and said modulated first carrier is disposed in a lower portion of said composite signal modulation frequency spectrum.

13. A system for processing a high definition television signal providing greater image definition than a standard definition television signal, comprising:

means for modulating a first carrier with first television signal information to produce a modulated first carrier;

means for modulating a second carrier with second television signal information to produce a modulated second carrier; and means for combining said modulated first and second carriers to produce a composite modulated signal containing high definition television information, said composite signal exhibiting a bandwidth compatible with the bandwidth of a standard definition television signal channel, and having a modulation frequency spectrum exhibiting signal attenuation at frequencies associated with high energy information in said standard definition television signal; wherein said second carrier exhibits a data rate which is an integral multiple of the data rate of said first carrier.

14. A system according to claim 13 wherein said integral multiple is 4.

15. In a system for receiving a high definition television signal comprising a composite modulated signal including a first carrier modulated with first information and a second carrier modulated with second information, said first information exhibiting a large amplitude relative to said second information, said first and second modulated carriers being separated by a band exhibiting signal attenuation at frequencies associated with high energy information in a standard definition television signal, said composite modulated signal having a bandwidth compatible with the bandwidth of a standard definition television signal channel, apparatus exhibiting signal attenuation at said frequencies associated with high energy information in a standard definition television signal and comprising:

means responsive to said composite modulated signal for separating said modulated first carrier and said modulated second carrier;

first signal processing means including means for demodulating said modulated first and second carriers to recover said first and second information; and second signal processing means responsive to recovered first and second information from said demodulating means for developing an image representative output signal.

16. Apparatus according to claim 15, wherein said demodulating means quadrature amplitude demodulates said modulated first carrier, and quadrature amplitude demodulates said modulated second carrier.

17. Apparatus according to claim 15 wherein said recovered first information exhibits a narrow bandwidth relative to said recovered second information.

18. Apparatus according to claim 15, wherein said recovered first information occupies a lower portion of the frequency spectrum of said composite modulated signal; and said recovered second information occupies an upper portion of said frequency spectrum of said composite modulated signal.

19. Apparatus according to claim 15 and further comprising means for decompressing said first and second information.

20. Apparatus according to claim 15, wherein said recovered first information comprises video information including primarily low frequency video information; and said recovered second information includes high frequency video information.

21. Apparatus according to claim 20, wherein said recovered first information additionally includes audio information; and said second signal processing means includes audio signal processing circuits.

22. Apparatus according to claim 15 and further including clock signal generating means responsive to a signal derived from said first information for producing a first clock signal.

23. Apparatus according to claim 22 wherein said clock signal generating means includes means for deriving a second clock signal from said first clock signal, said first and second clock signals having frequencies which are an integral multiple of each other.

24. In a system for receiving a high television signal comprising a composite modulated signal including a first carrier modulated with first information and a second carrier modulated with second information, said first and second modulated carriers being separated by a band exhibiting signal attenuation at frequencies associated with high energy information in a standard definition television signal, said composite modulated signal having a bandwidth compatible with the bandwidth of a standard definition television signal channel, apparatus exhibiting signal attenuation at said frequencies associated with high energy information in a standard definition television signal and comprising:

means responsive to said composite modulated signal for separating said modulated first carrier and said modulated second carrier;

first signal processing means including means for demodulating said modulated first and second carriers to recover said first and second information;

second signal processing means responsive to recovered first and second information from said demodulating means for developing an image representative output signal; and clock signal generating means responsive to a signal derived from said first information for producing a first clock signal, said clock signal generating means including means for deriving a second clock signal from said first clock signal, said first and second clock signals having frequencies which are an integral multiple of each other; wherein said multiple is 4.

25. In a system for receiving a high television signal comprising a composite modulated signal including a first carrier modulated with first information and a second carrier modulated with second information, said first and second modulated carriers being separated by a band exhibiting signal attenuation at frequencies associated with high energy information in a standard definition television signal, said composite modulated signal having a bandwidth compatible with the bandwidth of a standard definition television signal channel, apparatus exhibiting signal attenuation at said frequencies associated with high energy information in a standard definition television signal and comprising:

means responsive to said composite modulated signal for separating said modulated first carrier and said modulated second carrier;

first signal processing means including means for demodulating said modulated first and second carriers to recover said first and second information;

second signal processing means responsive to recovered first and second information from said demodulating means for developing an image representative output signal; and clock signal generating means responsive to a signal derived from said first information for producing a first clock signal, said clock signal generating means including means for deriving a second clock signal from said first clock signal, said first and second clock signals having frequencies which are an integral multiple of each other; wherein said first clock signal is applied to said first signal processing means for processing said second information, and said second clock signal is applied to said first signal processing means for processing said first information.

26. A system for processing a high definition television signal providing greater image definition than a standard definition television signal, comprising:

means for modulating a first carrier with first television signal information, comprising predominantly low-frequency information, to produce a modulated first carrier;

means for modulating a second carrier with second television signal information to produce a modulated second carrier, said second information exhibiting a smaller amplitude than said first information; and means for combining said modulated first and second carriers to produce a modulation frequency spectrum having a lower band portion containing said modulated first carrier and an upper band portion containing said modulated second carrier.

27. In a system for receiving a high definition television signal comprising a composite modulated signal including a first carrier modulated with first television signal information comprising predominantly low frequency information occupying a lower band portion of the frequency spectrum of said composite modulated signal, and a second carrier modulated with second television signal information occupying an upper band portion of said frequency spectrum of said composite signal, said second information exhibiting a smaller amplitude than said first information, apparatus comprising input means responsive to said television signal for producing said composite modulated signal at baseband frequencies;

first signal processing means responsive to said baseband composite modulated signal and including means for demodulating said modulated first and second carriers to recover said first information and said second information; and second signal processing means responsive to recovered first and second information from said demodulating means for developing an image representative output signal.

28. Apparatus according to claim 27, wherein said recovered first information exhibits a narrow bandwidth relative to said recovered second information and contains low frequency video information substantially exclusive of high frequency video information.

29. A system for processing a high definition television signal providing greater image definition than a standard television signal, comprising:

means for modulating a first carrier with first television signal information to produce a modulated first carrier;

means for modulating a second carrier with second television signal information to produce a modulated second carrier, said second information exhibiting a smaller amplitude than said first information; and means for combining said modulated first and second carriers to produce a modulation frequency spectrum having a lower band portion containing said modulated first carrier and an upper band portion containing said modulated second carrier, wherein said modulated first carrier is disposed in said lower band portion so that said modulated first carrier is subject to being significantly attenuated by a Nyquist slope filter of a standard definition television receiver.

30. In a system for receiving a high definition television signal comprising a composite modulated signal including a first carrier modulated with first information and a second carrier modulated with second information, said second information exhibiting a smaller amplitude than said first information, said modulated second carrier occupying an upper band portion frequency spectrum of said composite modulated signal and said modulated first carrier being disposed in a lower band portion of said frequency spectrum so that said modulated first carrier is subject to being significantly attenuated by a Nyquist slope filter of a standard definition television receiver, apparatus comprising:

input means responsive to said television signal for producing said composite modulated signal at baseband frequencies;

first signal processing means responsive to said baseband composite modulated signal and including means for demodulating said modulated first and second carriers to recover said first information and said second information; and second signal processing means responsive to recovered first and second information from said demodulating means for developing an image representative output signal.

31. A system for encoding an HDTV signal, comprising:
a source of compressed first digital data and compressed second digital data representative of HDTV image data, said first data having a higher priority than said second data;
means responsive to said first and second digital data for providing first and second suppressed carrier QAM signals containing said first and second digital data respectively, said first QAM signal having a peak amplitude greater than that of said second QAM signal and having a bandwidth less than that of said second QAM signal; and
means, including means for combining said first and second QAM signals, for providing a signal occupying a standard television signal channel, wherein said first and second QAM signals occupy substantially mutually exclusive spectral bands in said channel, said spectral bands being located in frequency bands normally occupied by the vestigial sideband and the upper sideband of a standard television signal respectively.

32. A receiver system for processing an HDTV signal comprising first and second suppressed carrier QAM signals occupying mutually exclusive spectral bands in a standard television signal channel, said first QAM signal (a) being located in a frequency band normally occupied by the vestigial sideband of a standard television signal, (b) containing compressed digital data with a high priority relative to compressed digital data contained by said second QAM signal, (c) having a peak amplitude greater than that of said second QAM signal, and (d) having a bandwidth less than that of said second QAM signal, said second QAM signal being located in a frequency band of said standard television channel normally occupied by the upper sideband of said standard television signal; said system comprising:
means for demodulating said first and second QAM signals to recover associated compressed digital data;
means for decompressing said recovered digital data; and
means responsive to said decompressed recovered digital data for developing an image representative signal.

33. A system for encoding a high definition television (HDTV) signal, comprising:
a source of compressed first digital data and compressed second digital data representative of HDTV image data;
means for providing first and second signals modulated by said first and second digital data respectively; and
means for combining said first and second modulated signals for providing a signal occupying a standard television signal channel, said first and second modulated signals occupying substantially mutually exclusive spectral bands in said channel respectively; wherein
said first and second modulated signals occupy lower and upper spectral bands in said channel respectively;

said first modulated signal exhibits an amplitude greater than that of said second modulated signal; and said first modulated signal contains video information sufficient to reproduce a viewable lower definition image independent of video information associated with said second modulated signal.

34. A system for receiving a high definition television signal containing a first signal modulated with audio and video information and a second signal modulated with video information occupying substantially mutually exclusive lower and upper spectral bands within a standard television channel respectively, said first modulated signal containing video and audio information sufficient to produce a viewable lower definition image independent of information associated with said second modulated signal; said system comprising
means for demodulating said first and second modulated signals to recover associated audio and video information;
means for combining recovered video information associated with said first modulated signal with recovered video information associated with said second modulated signal for producing a combined video signal;
video signal processing means responsive to said combined video signal for producing an image representative signal;. and
audio signal processing means responsive to recovered audio information associated with said first modulated signal.

35. A system according to claim 34, and further including
clock signal generating means responsive to a signal derived from said first modulated signal.

36. In a system for receiving a high definition television signal providing greater image definition than a standard definition television signal and comprising a composite modulated signal including a first carrier quadrature amplitude modulated with quadrature phased versions of said first television information and a second carrier quadrature amplitude modulated with quadrature phased versions of said second television information, said composite signal exhibiting a bandwidth comparable with the bandwidth of a standard definition television signal channel, and having a modulation frequency spectrum exhibiting signal attenuation at frequencies associated with high energy information in said standard definition television signal, apparatus comprising:
means responsive to said composite modulated signal for separating said modulated first carrier and said modulated second carrier;
first signal processing means including means for demodulating said modulated first and second carriers to recover said first and second information; and
second signal processing means responsive to recovered first and second information from said demodulating means for developing an image representative output signal.

37. In a system for receiving a high definition television signal providing greater image definition than a standard definition television signal and comprising a composite modulated signal including a suppressed first carrier modulated with first television information and a suppressed second carrier modulated with second television information, said composite signal exhibiting a bandwidth compatible with the bandwidth of a standard definition television signal channel, and having a modulation frequency spectrum exhibiting signal attenuation at frequencies associated with high energy information in said standard definition television signal, apparatus comprising:

means responsive to said composite modulated signal for separating said modulated first carrier and said modulated second carrier;

first signal processing means including means for demodulating said modulated first and second carriers to recover said first and second information; and second signal processing means responsive to recovered first and second information from said demodulating means for developing an image representative output signal.

38. In a system for receiving a high definition television signal providing greater image definition than a standard definition television signal and comprising a composite modulated signal including a first carrier modulated with first television information representing compressed digital information and a second carrier modulated with second television information representing compressed digital information, said composite signal exhibiting a bandwidth compatible with the bandwidth of a standard definition television signal channel, and having a modulation frequency spectrum exhibiting signal attenuation at frequencies associated with high energy information in said standard definition television signal, apparatus comprising:

means responsive to said composite modulated signal for separating said modulated first carrier and said modulated second carrier;

first signal processing means including means for demodulating said modulated first and second carriers to recover said first and second information; and second signal processing means responsive to recovered first and second information from said demodulating means for developing an image representative output signal.

39. In a system for receiving a high definition television signal providing greater image definition than a standard definition television signal and comprising a composite modulated signal including a first carrier modulated with first television information and a second carrier modulated with second television information, said second carrier exhibiting a frequency which is an integral multiple of the frequency of said first carrier, said composite signal exhibiting a bandwidth compatible with the bandwidth of a standard definition television signal channel, and having a modulation frequency spectrum exhibiting signal attenuation at frequencies associated with high energy information in said standard definition television signal, apparatus comprising:

means responsive to said composite modulated signal for separating said modulated first carrier and said modulated second carrier;

first signal processing means including means for demodulating said modulated first and second carriers to recover said first and second information; and second signal processing means responsive to recovered first and second information from said demodulating means for developing an image representative output signal.

* * * * *